United States Patent
Sexton et al.

(10) Patent No.: US 8,753,502 B1
(45) Date of Patent: Jun. 17, 2014

(54) USING LOW CARBON FUEL WITH A CATALYST CHARGE HEATER

(75) Inventors: Jeff Sexton, Findlay, OH (US); David A. Lomas, Barrington, IL (US)

(73) Assignee: Marathon Petroleum Company LP, Findlay, OH (US)

( * ) Notice: Subject to any disclaimer, the term of this patent is extended or adjusted under 35 U.S.C. 154(b) by 1067 days.

(21) Appl. No.: 12/655,125

(22) Filed: Dec. 22, 2009

(51) Int. Cl.
 *C10G 11/18* (2006.01)

(52) U.S. Cl.
 CPC .................................... *C10G 11/182* (2013.01)
 USPC ...................... 208/120.01; 208/100; 208/113

(58) Field of Classification Search
 USPC ..................... 208/100, 120.01, 113
 See application file for complete search history.

(56) References Cited

U.S. PATENT DOCUMENTS

| | | | |
|---|---|---|---|
| 3,838,036 A * | 9/1974 | Stine et al. | 208/120.01 |
| 4,006,075 A | 2/1977 | Luckenbach | |
| 4,167,492 A | 9/1979 | Varady | |
| 4,960,503 A * | 10/1990 | Haun et al. | 208/85 |
| 5,149,261 A * | 9/1992 | Suwa et al. | 431/207 |
| 5,160,426 A | 11/1992 | Avidan | |
| 5,338,439 A | 8/1994 | Owen et al. | |
| 5,858,207 A | 1/1999 | Lomas | |
| 6,558,531 B2 | 5/2003 | Steffens et al. | |
| 6,866,771 B2 | 3/2005 | Lomas et al. | |
| 6,869,521 B2 | 3/2005 | Lomas | |
| 7,445,936 B2 | 11/2008 | O'Connor et al. | |
| 2006/0042701 A1 * | 3/2006 | Jansen | 137/606 |
| 2008/0247942 A1 * | 10/2008 | Kandziora et al. | 423/651 |

OTHER PUBLICATIONS

Baukal et al., Natural-Draft Burners, Industrial Burners Handbook, CRC Press 2003.*
Spekuljak et al., Fluid Distributors for Structured Packing Columns, AICHE, Nov. 1998.*
Hemler et al., UOP Fluid Catalytic Cracking Process, Handbook of Petroleum Refining Processes, 3d ed., McGraw Hill 2004.*

* cited by examiner

*Primary Examiner* — Prem C Singh
*Assistant Examiner* — Brandi M Doyle
(74) *Attorney, Agent, or Firm* — Emch, Schaffer, Schaub & Porcello Co., L.P.A.

(57) ABSTRACT

This procedure uses a low carbon fuel with a FCC Catalyst Heater-Fuel Gas/Catalyst Combustion Chamber. The low carbon content fuel source will minimize CO2 emissions while satisfying unit heat balance. This will further reduce coke yield and CO2 emissions while improving energy efficiency.

16 Claims, 8 Drawing Sheets though the gas concentration distillation towers. This constrains unit capacity and reduces LPG recovery. The resulting dry gas product also contains a lower heat value.

USING LOW CARBON FUEL WITH A CATALYST CHARGE HEATER

TECHNICAL FIELD

This invention relates to the use of a low carbon fuel with a FCC Catalyst Heater-Fuel Gas/Catalyst Combustion Chamber. The low carbon content fuel source will minimize CO2 emissions while satisfying unit heat balance. The result is a lower coke yield and higher liquid volume yield of products. This will further reduce coke yield and CO2 emissions while improving energy efficiency.

BACKGROUND OF THE INVENTION

Catalytic cracking is a petroleum refining process which is applied commercially on a very large scale. A majority of the refinery gasoline blending pool in the United States is produce by this process. In the catalytic cracking process heavy hydrocarbon fractions are converted into lighter products by reactions taking place at elevated temperature in the presence of a catalyst, with the majority of the conversion or cracking occurring in the vapor phase. The feedstock is thereby converted into gasoline, distillate and other liquid cracking products as well as lighter gaseous cracking product.

During catalytic cracking, heavy material, known as coke, is deposited onto the catalyst. This reduces its catalytic activity and regeneration is desired. After removal of hydrocarbons from the spent cracking catalyst, regeneration is accomplished by burning off the coke which restores the catalyst activity. The three characteristic steps of the catalytic cracking can be therefore be distinguished: a cracking step in which the hydrocarbons are converted into lighter products, a stripping step to remove hydrocarbons adsorbed on the catalyst and a regeneration step to burn off coke from the catalyst. The regenerated catalyst is then reused in the cracking step.

For modern refineries, the Fluid Catalytic Cracking Unit (FCCU) produces 40 to 60+% of the gasoline in the gasoline pool. In addition, the FCCU produces a blendstock component for diesel manufacture. Air quality regulations for these transportation fuels will require a further improvement in air quality as mandated by the Clean Air Act. For the FCCU process, there are two routes a refiner can utilize to further reduce the impurity content of these transportation fuels. The first route is via a hydrotreatment process on the feedstock to the FCCU. This hydrotreatment process can by operational severity and design, remove a substantial amount of the feed impurity to produce a gasoline impurity content of 100 ppmw or less. The second route a refiner can take involves the use of a specialized catalyst or additive in the FCCU circulating catalyst inventory that can catalytically remove impurities from the FCCU product distributions. Refiners may elect to use this route for both non-hydrotreated and/or hydrotreated FCCU feedstock derived from various crude sources. In addition, if a refiner utilizes the first route for desired gasoline content, when the hydrotreater is taken out of service for an outage, this specialized catalyst or additive can be utilized to minimize the increase of gasoline impurities during the outage period.

FCC dry gas product contains inert gases (O2, CO, CO2 and N2) that are entrained with the regenerated catalyst as catalyst flows from the regenerator to the reactor. The inerts are contained in the interstices of the catalyst and are required to provide the fluidization medium to allow the catalyst to behave like a fluid. The inerts are typically 0.8 lb/Mlb CCR. They pass through the reactor and main column where they are compressed and go through the gas concentration unit. The inerts reduce the WGC capacity and increase vapor traffic through the gas concentration distillation towers. This constrains unit capacity and reduces LPG recovery. The resulting dry gas product also contains a lower heat value.

Other objects and advantages of the present invention will become apparent to those skilled in the art upon a review of the following detailed description of the preferred embodiments and the accompanying drawings.

SUMMARY OF THE INVENTION

We now have found that the use of a low carbon fuel with a FCC Catalyst Heater-Fuel Gas/Catalyst Combustion Chamber improves FCC processes as follows. Most conventional FCC feedstocks typically contain enough coke precursors in the form of multi-ring aromatics to deposit sufficient "catalytic coke" on the circulating catalyst to effectively satisfy the overall unit enthalpy balance while achieving the desired level of conversion. However, the unit enthalpy balance must always be met via a certain amount of coke or coke yield on fresh feed regardless of the feedstock's quality.

FCC processes have continued to evolve with unit designs that offer greater processing flexibility with enhanced product yields via improved coke selectivity. Recent regulations requiring low sulfur gasoline has resulted in increased processing of hydrotreated feedstocks. This has led to unit design modifications to further improve total liquid product yields and reduce regenerator "Green House" gases, $NO_X$ and $SO_X$ emissions. Use of an FCC Catalyst Heater via a fuel gas/catalyst combustion chamber is a novel method to achieve this. This device will satisfy the FCC unit heat balance while maximizing liquid volume yield and reducing FCC emissions.

The use of well hydrotreated feedstocks that operate with low delta coke is intended for use with an FCC catalyst heater.

IN THE DRAWINGS

DETAILED DESCRIPTION OF THE INVENTION

For over years the FCC process has continued to evolve with unit designs that offer greater processing flexibility with enhanced product yields via improved coke selectivity. Recent regulations requiring low sulfur gasoline has resulted in increased processing of hydrotreated feedstocks. This has led to process optimization and additional unit design modifications to further improve total liquid product yields and reduce regenerator "Green House" gases, $NO_X$ and $SO_X$ emissions. Use of an FCC catalyst heater via a fuel gas/catalyst combustion chamber is a novel method to achieve this. This device will satisfy the FCC unit heat balance while maximizing liquid volume yield and reducing FCC emissions.

Figure 1:
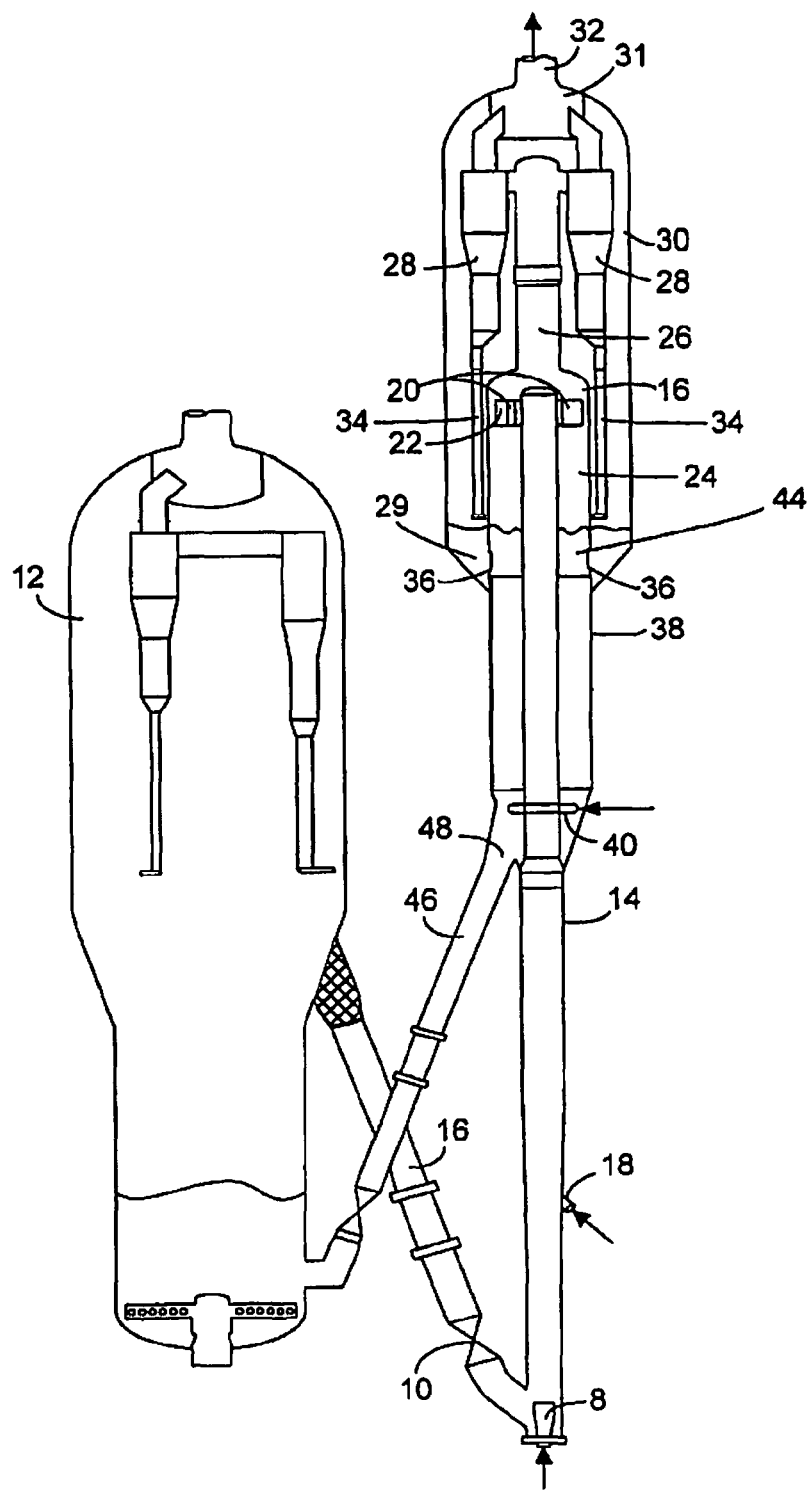
FIG. 1 is a schematic diagram of a conventional FCCU unit comprising a reactor, a combustor regenerator, and a riser without the FCC Catalyst Charge Heater of this invention.

FIG. 1 is a schematic diagram of a typical FCC unit showing a combustor regenerator, separator and stripper. FIG. 1 shows an FCC unit, comprising standpipe 16 that transfers catalyst from regenerator 12 at a rate regulated by slide valve 10. A fluidization medium from nozzle 8 transports catalyst upwardly through a lower portion of a riser 14 at a relatively high density until a plurality of feed injection nozzles 18 (only one is shown) inject feed across the flowing stream of catalyst particles. The resulting mixture continues upwardly through an upper portion of riser 14 to a riser termination device. This specific device utilizes at least two disengaging arms 20 tangentially discharge the mixture of gas and catalyst through openings 22 from a top of riser 14 into disengaging vessel 24 that effects separation of gases from the catalyst. Most of the catalyst discharged from openings 22 fall downwardly in the disengaging vessel 24 into bed 44. Transport conduit 26 carries the separated hydrocarbon vapors with entrained catalyst to one or more cyclones 28 in reactor or separator vessel 30. Cyclones 28 separate spent catalyst from the hydrocarbon vapor stream. Collection chamber 31 gathers the separated hydrocarbon vapor streams from the cyclones for passage to outlet nozzle 32 and into a downstream fractionation zone (not shown). Diplegs 34 discharge catalyst from the cyclones 28 into bed 29 in a lower portion of disengaging vessel 30 which pass through ports 36 into bed 44 in disengaging vessel 24. Catalyst and adsorbed or entrained hydrocarbons pass from disengaging vessel 24 into stripping section 38. Catalyst from openings 22 separated in disengaging vessel 24 passes directly into stripping section 38. Hence, entrances to the stripping section 38 include openings 22 and ports 36. Stripping gas such as steam enters a lower portion of the stripping section 38 through distributor 40 and rises counter-current to a downward flow of catalyst through the stripping section 38, thereby removing adsorbed and entrained hydrocarbons from the catalyst which flow upwardly through and are ultimately recovered with the steam by the cyclones 28. Distributor 40 distributes the stripping gas around the circumference of stripping section 38. In order to facilitate hydrocarbon removal, structured packing may be provided in stripping section 38. The spent catalyst leaves stripping section 38 through port 48 to reactor conduit 46 and passes into regenerator 12. The catalyst is regenerated in regenerator 12 as is known in the art and sent back to riser 14 through standpipe 16.

In cracking carbo-metallic feedstocks in accordance with FCC processes, the regeneration gas may be any gas which can provide oxygen to convert carbon to carbon oxides. Air is highly suitable for this purpose in view of its ready availability. The amount of air required per pound of coke for combustion depends upon the desired carbon dioxide to carbon monoxide ratio in the effluent gases and upon the amount of other combustible materials present in the coke, such as hydrogen, sulfur, nitrogen and other elements capable of forming gaseous oxides at regenerator conditions.

The regenerator is operated at temperatures in the range of about 1000.degree. to 1600.degree.F., preferably 1275.degree. to 1450.degree.F., to achieve adequate combustion while keeping catalyst temperature below those at which significant catalyst degradation can occur. In order to control these temperatures, it is necessary to control the rate of burning which in turn can be controlled at lest in part by the relative amounts of oxidizing gas and carbon introduced into the regeneration zone per unit time.

Figure 2:
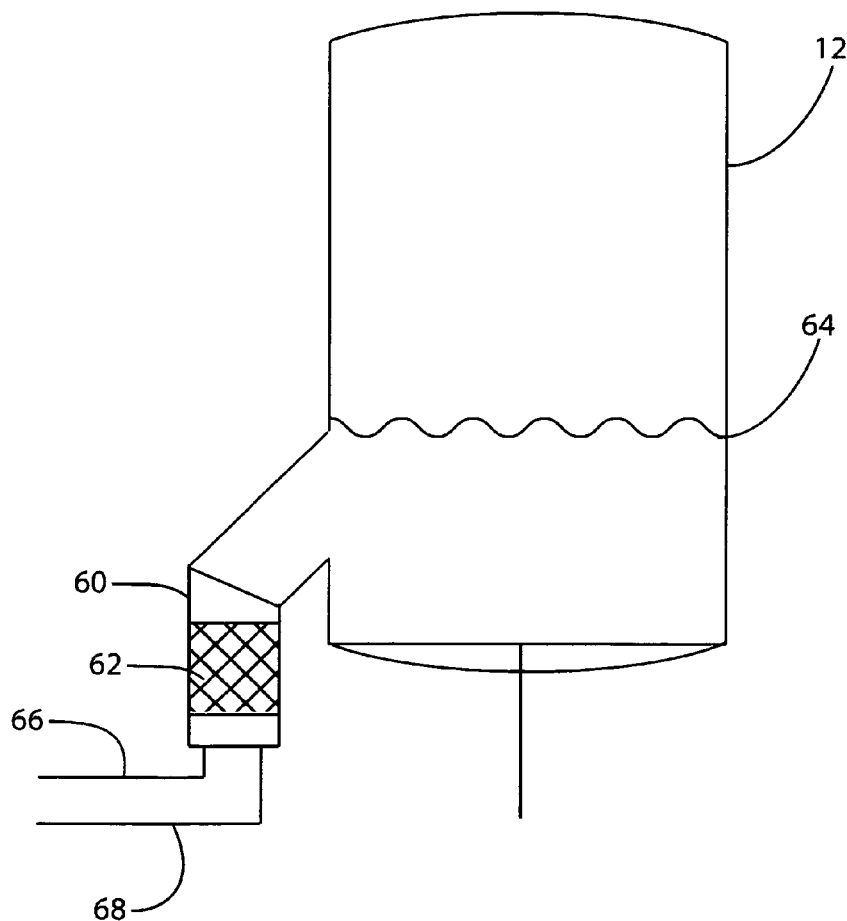
FIG. 2 shows a FCC fuel gas/catalyst combustion chamber of this invention external to a bubbling bed regenerator with a flowthrough or backmixed catalyst flow configuration.

FIG. 2 shows FCC fuel gas/catalyst combustion chamber 60 of this invention external to regenerator 12 with a flowthrough or backmixed catalyst flow configuration with gas distributor and structured packing 62 which is temperature controlled, original regenerator temperature 1250 F, new regenerator temperature 1320 F, chamber temperature 1360 F. Regenerator 12 contains spent catalyst 64. Fuel gas 66 and air or oxygen 68 are fed to combustion chamber 60.

Figure 3:
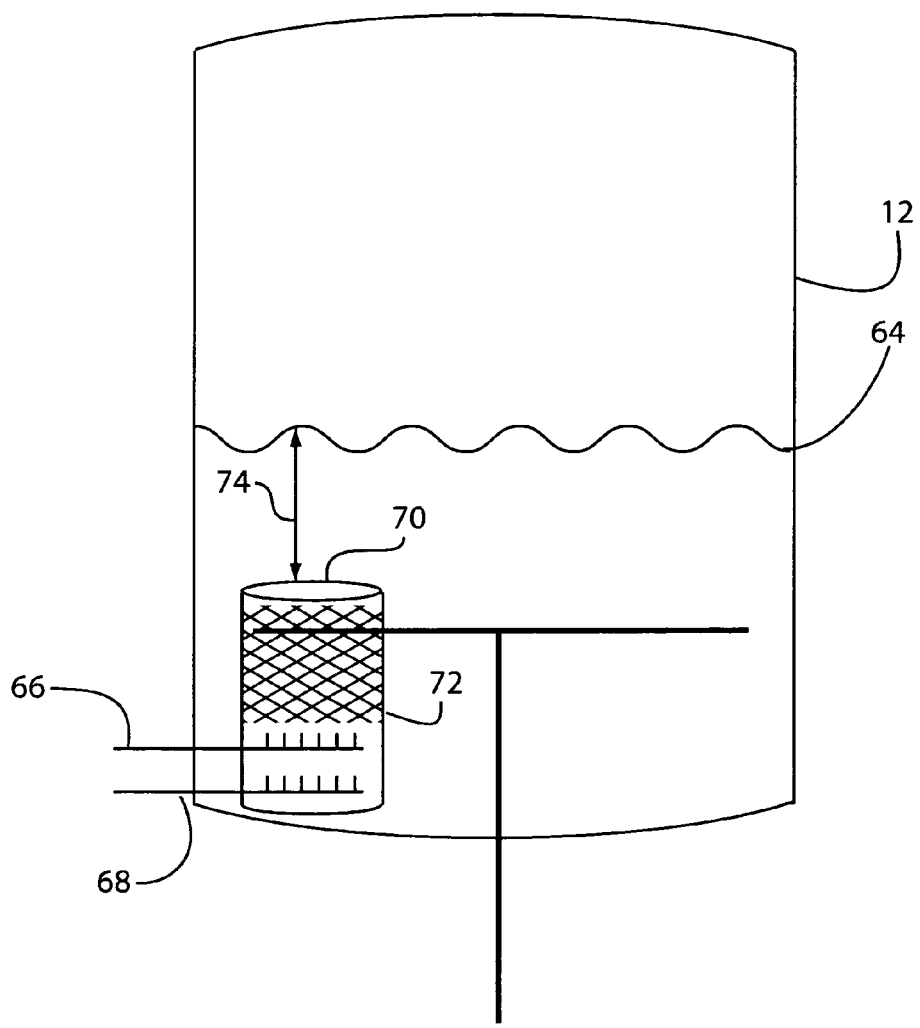
FIG. 3 shows a FCC fuel gas/catalyst combustion chamber of this invention internal to a bubbling bed regenerator with a backmixed catalyst heater cylinder flow configuration.

FIG. 3 shows FCC fuel gas/catalyst combustion chamber 70 of this invention internal to regenerator 12 with a backmixed catalyst heater cylinder flow configuration with gas distributor and structured packing 72 which is temperature controlled original regenerator temperature 1250 F, new regenerator temperature 1320 F, and chamber temperature 1360 F. Multiple chambers may be used in a given bed. Minimum distance 74 required between combustion chamber 70 and spent catalyst 64.

Figure 4:
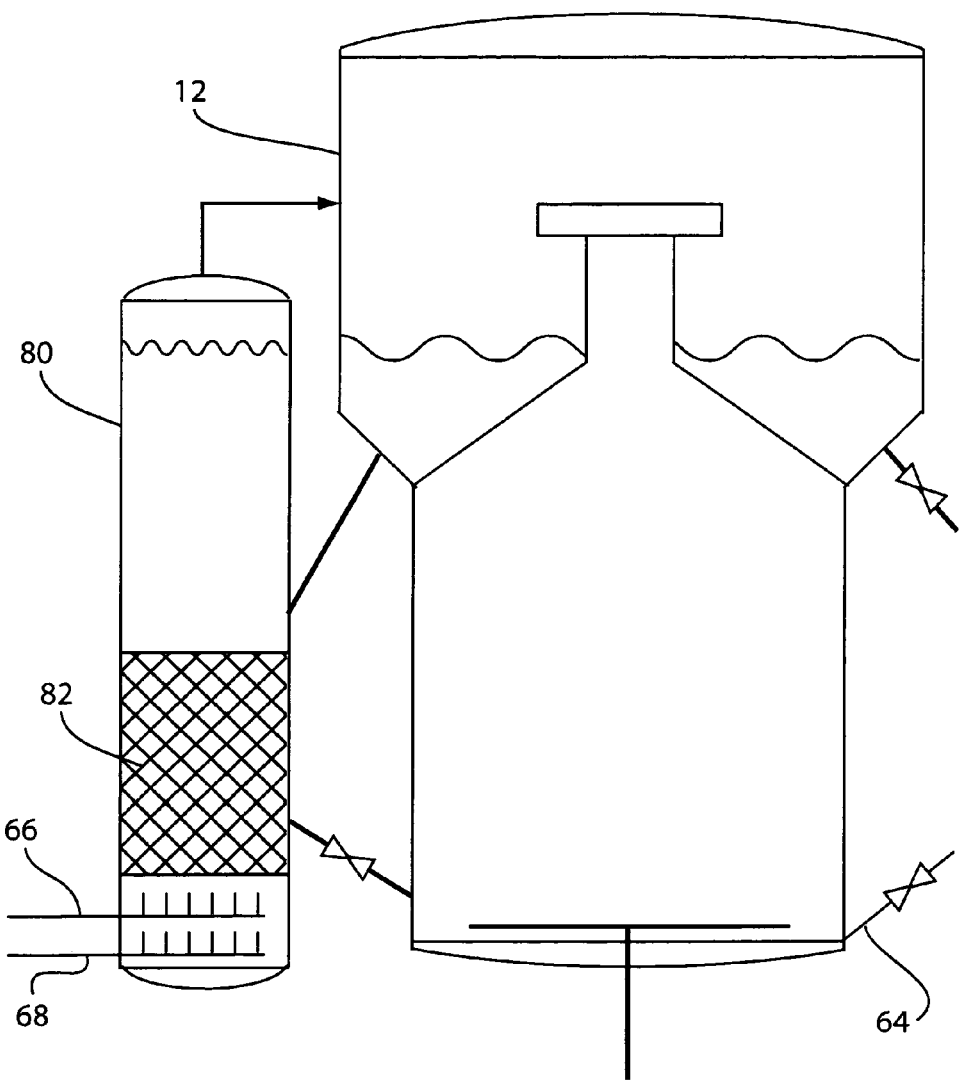
FIG. 4 shows a FCC fuel gas/catalyst combustion chamber of this invention internal or external to a combustor regenerator with a hybrid catalyst flow configuration.

FIG. 4 shows FCC fuel gas/catalyst combustion chamber 80 of this invention internal or external to the regenerator with a hybrid catalyst flow configuration with gas distributor and structured packing 82 which is temperature controlled, original regenerator temperature 1250 F, new regenerator temperature 1320 F, chamber temperature 1360 F.

Figure 5:
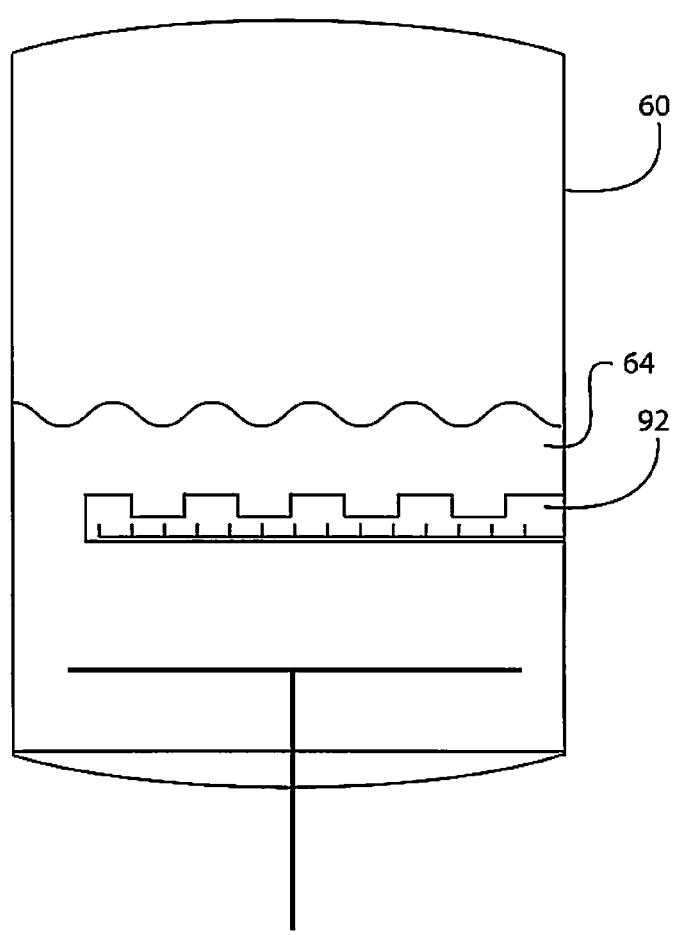
FIG. 5 shows a FCC fuel gas/catalyst combustion chamber of this invention with an internal gas fluidization distributor with spent catalyst distribution.

FIG. 5 shows FCC fuel gas/catalyst combustion chamber 60 of this invention, with an internal gas fluidization distributor 92 with spent catalyst 64.

Figure 6:
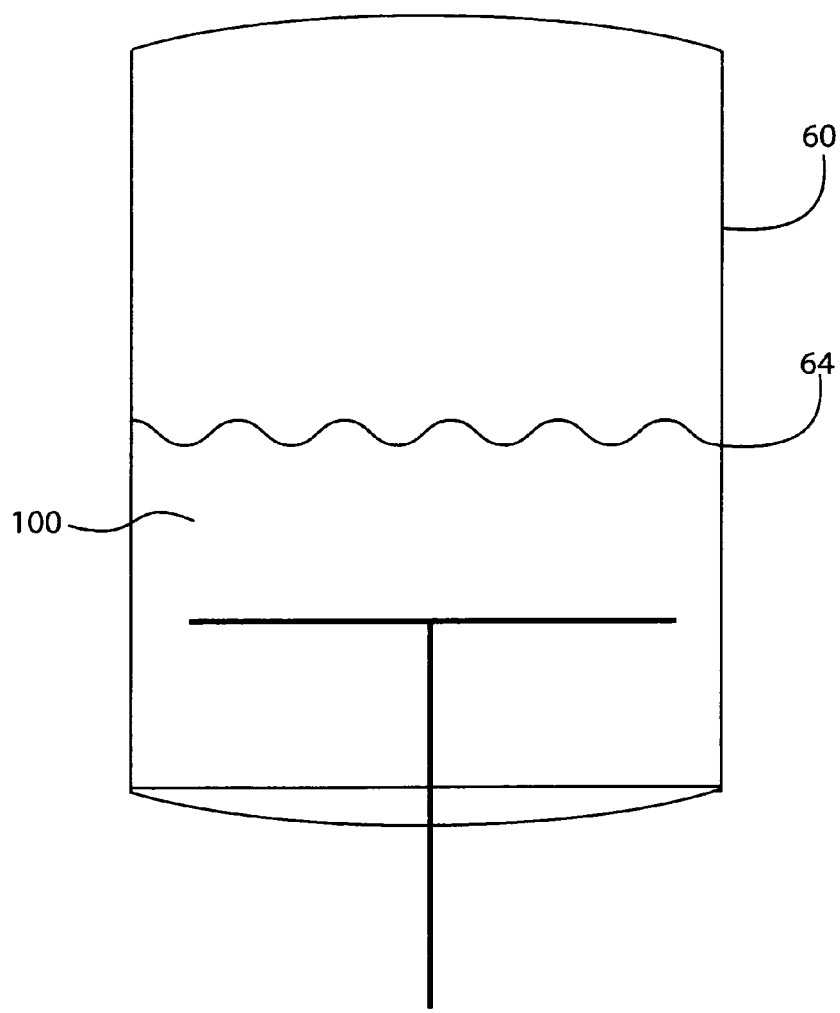
FIG. 6 shows a FCC fuel gas/catalyst combustion chamber of this invention with multiple nozzle gas distribution into a bed.

FIG. 6 shows FCC fuel gas/catalyst combustion chamber 60 of this invention with gas lance 100 into bed. The multiple nozzle gas distribution into bed utilizes an oxygen thermal lance. This is a lance that uses fuel plus oxygen to generate heat. This would have an added benefit of reducing CO2 emission using oxygen as a heat source. One such lance is a Praxair "Thermal Lance". The oxygen jet issues from thermal nozzle with these unique characteristics: high temperatures (typ. >2400 F); high velocity (typ. >2500 ft/s); high concentration of radicals (important for combustion chemistry); demonstrated reactivity and kinetics due to injection of highly reactive gas; and unique mixing properties result in temperature reduction in an extremely short distance from the oxygen jet. Multiple lances 100 may be used.

Figure 7:
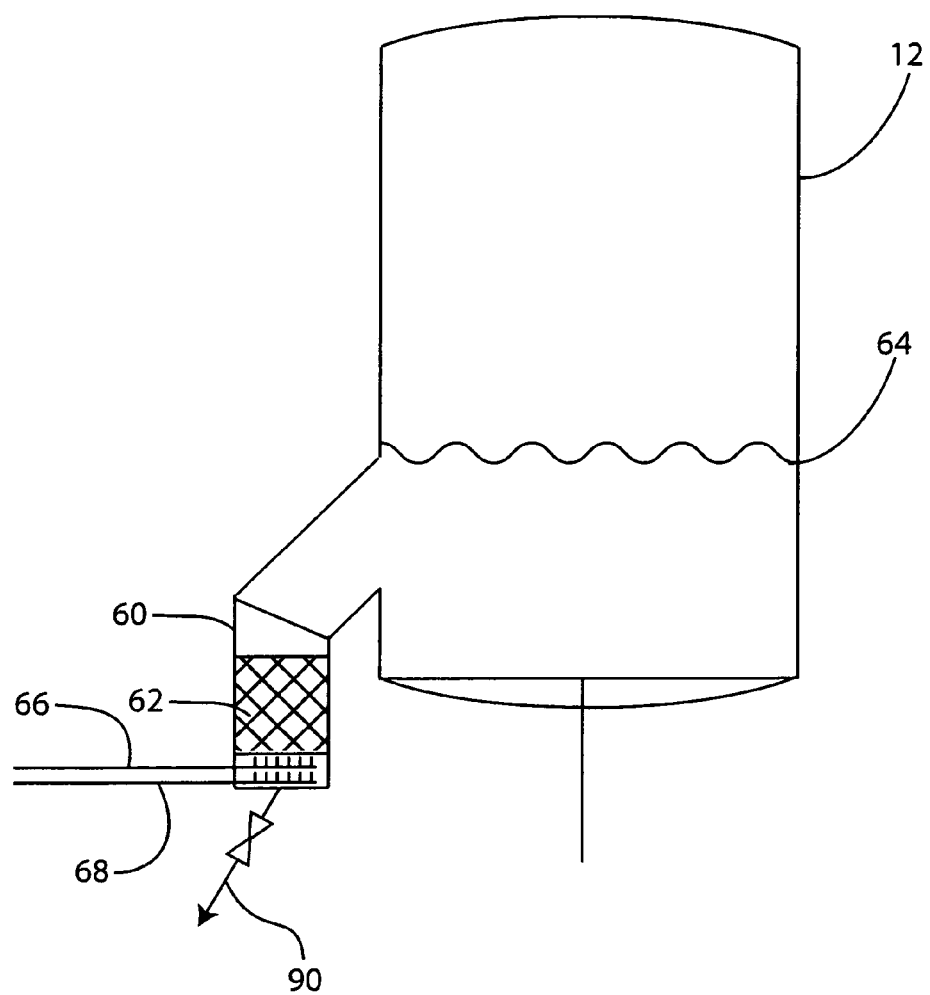
FIG. 7 shows a FCC fuel gas/catalyst combustion chamber of this invention internal or external to a bubbling bed regenerator integrated with the regenerated catalyst flow configuration for direct heating.

FIG. 7 shows FCC fuel gas/catalyst combustion chamber 60 of this invention external to regenerator 12 integrated with the regenerated catalyst flow configuration for direct heating of the catalyst. The chamber will utilize a gas distributor and structured packing 62 which is temperature controlled, original regenerator temperature 1250 F, new regenerator temperature 1250 F, chamber temperature 1360 F. Regenerated catalyst 90 exits chamber 60.

Figure 8:
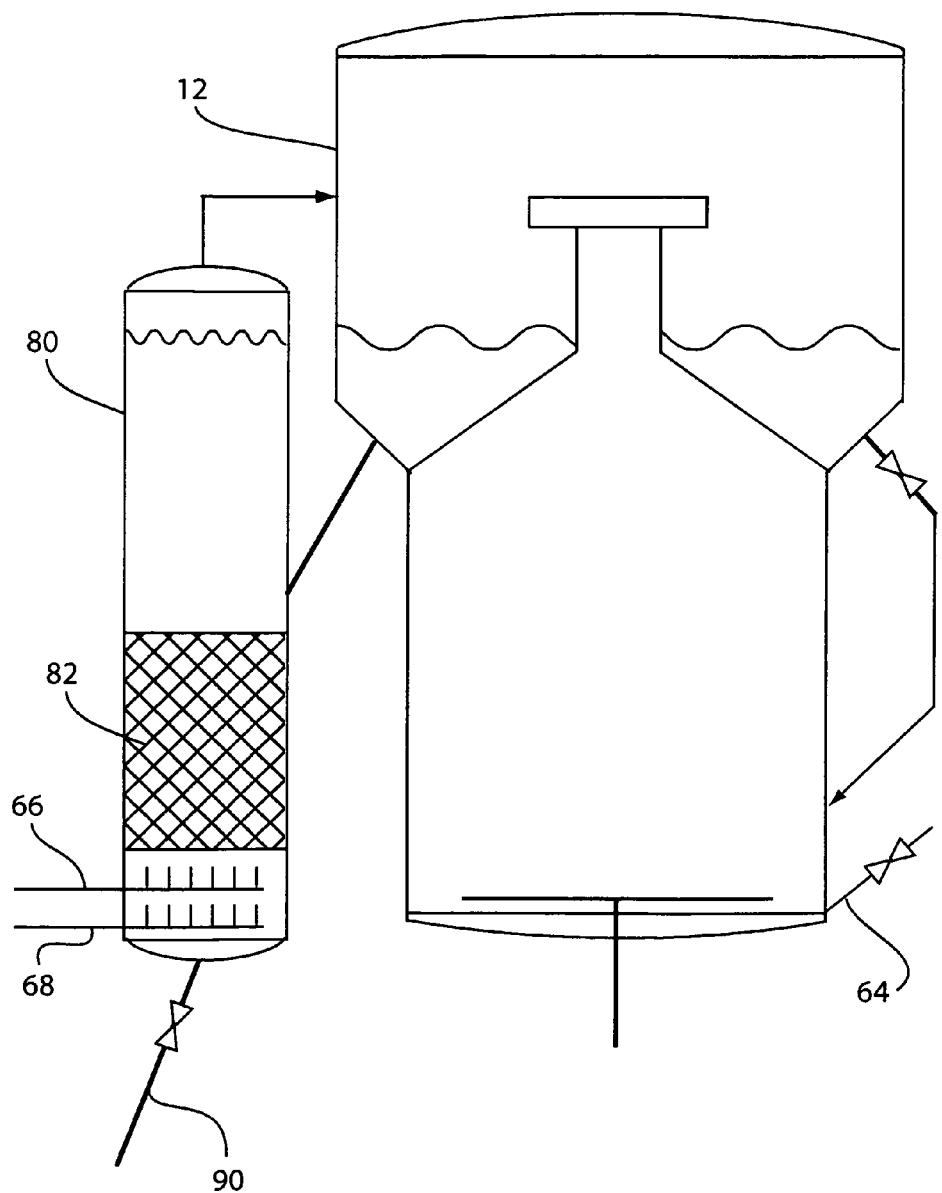
FIG. 8 shows a FCC fuel gas/catalyst combustion chamber of this invention internal or external to a combustor regenerator integrated with the regenerated catalyst flow configuration for direct heating.

FIG. 8 shows FCC fuel gas/catalyst combustion chamber 80 of this invention internal or external to the regenerator with the regenerated catalyst flow configuration for direct heating of the catalyst. The chamber will utilize a gas distributor and structured packing 82 which is temperature controlled, original regenerator temperature 1250 F, new regenerator temperature 1250 F, chamber temperature 1360 F.

The structured packing used in this invention may compromise ribbons. The ribbons may comprise a variety of materials. The ribbons may be corrugated. Corrugated ribbons refer to metal strips formed with at least two bands angular to or uncoplanar with each other. To form corrugations, the bands may be bent or formed relative to each other or separate pieces may be fixed to each other such as by welding to define joints between bands. The ribbons partially obstruct downward passage of catalyst particles and upward passage of gas. Preferably, the bands are disposed to obstruct passage of gas and catalyst. Adjacent ribbons have edges that define openings to allow passage of catalyst particle and gases. The ribbons are arranged in arrays and one or more arrays of ribbons define layers. The layers may be stacked upon each other and may be oriented differently. The layers may be oriented at 90° to each other. Outer circumferential edges of the packing are sheared or formed to conform to the interior of the catalyst heater.

EXAMPLE I

An FCC unit was revamped to install modern reactor technology of this invention. Testing was performed using Reaction Mixing Sampling (RMS) to evaluate yield changes. The most significant impact on product yields was derived from the reactor stripper modifications. Overall delta coke and hydrogen in coke was reduced substantially. Table I summarizes the key parameters in the pre-post revamps transient heat balance.

TABLE 1

REVAMPED STRIPPER AND UNIT HEAT BALANCE

| DATA | PRE-REVAMP | POST-REVAMP | |
|---|---|---|---|
| HEAT BALANCED | YES | TRANSITION | YES |
| OPERATING CONDITIONS | | | |
| REACTOR TEMP F. | 990 | 990 | 1015 |
| REGEN TEMP F. | 1330 | 1330 | 1276 |
| HEAT BALANCE | | | |
| CAT/OIL | 6.5 | 6.5 | 8.5 |
| DELTA COKE wt % | 0.74 | 0.55 | 0.55 |
| H2 in COKE wt % | 8 | 6.5 | 6.5 |
| DELTA TEMPERATURE F. | 340 | 340 | 261 |
| STRIPPING STEAM wt % | 2.2 | 1.43 | 1.2 |
| COKE wt % | 4.8 | 3.6 | 4.6 |

The pre-post heat balanced unit shows a net reduction in delta coke and hydrogen in coke of 25.7% and 18.8% respectively, these are enormous changes. These changes would result in a transitory reduced coke yield of 1.2 wt % on fresh feed at constant cat/oil and operating conditions. However, the unit enthalpy balance must be maintained, requiring higher catalyst circulation or cat/oil (6.5 to 8.5) in order to meet the new post-revamp enthalpy balance. The post-revamp enthalpy balance was also externally changed with the higher reactor temperature and reduced cooler duty to require a net 4.6 wt % coke yield on fresh feed. The significance of this shift in stripper performance is: at constant processing conditions (Reactor temperature, cooler duty and feed temperature) the net result would be lower regenerator temperature, therefore higher cat/oil, conversion and heat of reaction but lower heat of combustion (Btu/#coke) due to the cokes reduced hydrogen content. Net result would be a higher wt % coke yield even with the reduced flue gas temperature and enthalpy.

For constant conversion, at the same reactor temperature and cat/oil the resultant coke yield would be reduced to around 3.6 wt % on fresh feed. The units constrained enthalpy balance presently prevents this. When processing these severely hydrotreated feeds with modern reactor designs and catalyst formulations this (4.8–3.6) wt % additional and catalytically unnecessary enthalpy coke yield must still be met. Only things like higher feed temperatures or the combustion of clean hydrogen rich fuel gases within the regenerator are solutions to further increasing liquid volume yields with lower emissions and green house gases.

The catalyst delta coke or hydrocarbon is based on the catalytically adsorbed plus any voidage entrained hydrocarbons. The calculated pre-revamped voidage entering the stripper at minimum fluidization is 2.02 wt % on fresh feed, assuming a 100 mol wt reactor effluent. Using this voidage and the data in table 1 determines:

Reduced hydrocarbon entrainment to the regenerator (0.74−0.55)6.5=1.235 wt % fresh feed Reduced hydrocarbon entrainment to the regenerator 0.08 (0.74×6.5)−0.065 (0.55×6.5)=0.156 wt % fresh feed This displaced materials hydrogen content is therefore: 0.156/1.235=12.36 wt %

Net change in stripping efficiency on a voidage only basis 1.235/2.02=61.1%

These numbers are again very significant in not only supporting the claim of a substantial improvement in overall stripping efficiency but due to the displaced materials hydrogen content of 12.63 wt % this material was shown to be essentially pure unstripped riser effluent, since its hydrogen content is around that of the fresh feed. The data suggests the catalyst was previously "coring" through the stripper at fluxes much higher than the bubble rise velocity.

In the revamp example above, the unit heat balance adjusted to increase cat/oil and conversion. The use of an external source of hydrocarbon could manipulate the heat balance to reduce coke yield and increase liquid volume yield. If this external source was enriched in hydrogen (such as the dry gas product from the FCC, natural gas or reformer hydrogen) the net CO2 emissions would decrease along with $NO_X$ and $SO_X$.

EXAMPLE II

Most conventional FCC feedstocks typically contain enough coke precursors in the form of multi-ring aromatics to deposit sufficient "catalytic coke" on the circulating catalyst to effectively satisfy the overall until enthalpy balance must always be met via a certain amount of coke or coke yield on fresh feed regardless of the feedstock's quality.

This can be best illustrated using non-heat balanced pilot plant data. The following three distinctly different feedstocks demonstrate the coke yields produced at the desired optimum conversion varies enormously:

Residual Feed 10.65 Wt % on FF
Conventional VGO 4.85 Wt % on FF
Hydrotreated VGO 3.05 Wt % on FF A typical commercial unit's enthalpy balance can be operated within 4.5 to 5.5 wt % coke. (Total combustion, 350-450 F feed temperature and 990-1010 F reactor temperature). So when processing residual feeds the enthalpy balance must actually be expanded via CO production (Lower Ht combustion Btu/lb coke) or regenerator heat removal in the form of catalyst coolers in order to achieve the desired conversion. The hydrotreated feed presents the opposite scenario since we now desire to further contain the commercial unit's enthalpy balance and preserve maximum liquid volume yield. Table 2 illustrates how this can be done with the addition of a fuel gas/catalyst combustion chamber. The base case conventional operation produced a 5.55 Wt % coke yield at the stated operating conditions even though this feed produced only 3.1 Wt % coke at an equivalent conversion in the non-heat balanced pilot plant. There's a 2.45 Wt % additional coke yield in the commercial unit in order to satisfy the enthalpy requirement. This additional coke comes from valuable liquid products in the form of "soft coke" via catalyst circulation.

TABLE 2

FUEL GAS CATALYST COMBUSTION CHAMBER

|  | BASE CASE | FUEL GAS CASE |
|---|---|---|
| REACTOR TEMP F. | 1000 | 1000 |
| FEED TEMP F. | 400 | 400 |
| Circulating MAT | 71 | 73 |
| REGEN TEMP F. | 1245 | 1327 |
| H2 in COKE Wt % | 6.7 | 6.7 |
| Ht RX Btu/LB | 196 | 190 |
| Cat/Oil | 10.8 | 8.02 |
| Coke Yield Wt. % | 5.55 | 4.25 |
| Conv. Lv % | 84.2 | **** |
| Total Lv % | 113.1 | 114.2 |

25000 BPSD CASE
INCREASED LIQUID VOLUME YIELD OF 1.1 Lv %
FUEL GAS DUTY 60 MM BTU/HR Equivalent Methane consumed 0.698 wt %
13.3 Wt. % reduction in CO2 or 23.4 Wt % reduction with Hydrogen
23.4 Wt. % reduction in SOX & NOX
Carbon on Regen Cat reduced 0.2 to 0.05 wt %
CHARGE HEATER COULD BE CONSIDERED The novel addition of a fuel gas/catalyst combustion chamber improves the base case performance in many aspects:
Note: A feed charge heater addition in the base case could raise the feed to 660 F lowering the base case to 4.35 Wt % coke and the fuel gas case to 3.05 Wt %.
  Reduces the enthalpy balance on a fresh feed basis to 4.25 Wt % at equivalent reactor/feed temperatures.
  Increase in regenerated catalyst activity via improved combustion kinetics and thus lower carbon on regenerated catalysts.
  13.3 Wt % reduction in CO2 with methane fuel or 23.4 Wt % reduction with Hydrogen fuel. The source of the gas can be natural gas, reformer hydrogen or the dry gas product from the FCC recycled back to the regenerator. The preferred gas is higher in hydrogen content than the coke to reduce CO2 emissions and generate water as a combustion product.
  Greater than 23.4 Wt % reduction in SOX & NOX.
  A NET INCREASE IN LIQUID VOLUME YIELD OF 1.1 LV %.
  In the modified case there's still sufficient combined cracking severity (Reaction temperature, Cat/oil, and catalyst activity-oil) for the desired conversion.

EXAMPLE III

The FCC unit heat balance can be manipulated by several process variables to minimize coke yield. The feed parameters make the coke, but the enthalpy balance sets the coke yield. A base unit operating at 25,000 bpd feed is used to show examples of various options to manipulate the enthalpy balance. Use of air preheat, slurry heat exchange and a charge heater are compared to use of the novel concept of a catalyst heater using fuel gas in the following cases:
HEAT BALANCE OPTIONS 25000 BPSD CAPACITY

|  | BASE CASE | AIR HEATER | FEED TEMP | CHARGE HTR | FUEL GAS | CHTR/ FUEL GAS |
|---|---|---|---|---|---|---|
| RX TEMP | 1000 | 1000 | 1000 | 1000 | 1000 | 1000 |
| PRESS | 25 | 25 | 25 | 25 | 25 | 25 |
| STM | 2 | 2 | 2 | 2 | 2 | 2 |
| FEED TEMP | 400 | 400 | 350-450 | 650 | 400 | 650 |
| HT Rx | 200 | 200 | 200 | 200 | 200 | 200 |
| O2 | 2 | 2 | 2 | 2 | 2 | 2 |
| CO BURN | YES | YES | YES | YES | YES | YES |
| H2 in Coke | 6.5 | 6.5 | 6.5 | 6.5 | 6.5 | 6.5 |
| Regen Temp | 1242 | 1242 | 1243 | 1243 | 1342 | 1358 |
| Air INLET | 354 | 800 | 354 | 354 | 354 | 354 |
| Fuel Gas |  |  |  |  | 85 MMBTU/hr | 60 MMBTU/hr |
| COKE wt % | 5.59 | 5.05 | 5.82-5.35 | 4.31 | 3.8 | 3.04 |

MODIFICATIONS

Specific compositions, methods, or embodiments discussed are intended to be only illustrative of the invention disclosed by this specification. Variation on these compositions, methods, or embodiments are readily apparent to a person of skill in the art based upon the teachings of this specification and are therefore intended to be included as part of the inventions disclosed herein.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

We claim:
1. A fluidized bed catalytic cracking (FCC) process for treating gaseous hydrocarbons from a cracking catalyst, the process comprising the steps of:
  i) regenerating catalyst in a catalyst regenerator; by contact with oxygen containing gas to produce regenerated catalyst; and
  ii) recycling the regenerated catalyst to a standpipe for transfer to a cracking zone;
  iii) transferring the regenerated catalyst to a riser;
  iv) feeding a low carbon fuel and an oxidizing gas to a FCC catalyst heater for maintaining and adjusting unit heat balance in a catalytic cracking unit
  v) providing the FCC catalyst heater with a fuel gas/catalyst combustion chamber and structured packing;
  vi) using the fuel gas/catalyst combustion chamber with a flowthrough or backmixed catalyst flow configuration;
  vii) feeding the low carbon fuel and the oxidizing gas from the fuel gas/catalyst combustion chamber into the catalyst regenerator; and
  viii) using the FCC catalyst heater to control the rate of burning by controlling the amounts of oxidizing gas and the low carbon fuel introduced into the catalyst regenerator.
2. A process according to claim 1 further comprising the step of:
  placing the FCC catalyst heater external to the regenerator.

3. A process according to claim 1 further comprising the step of:
   placing the FCC catalyst heater internal to the regenerator.

4. A process according to claim 1 further comprising the step of:
   using the FCC catalyst heater with a multiple nozzle gas distribution configuration.

5. A process according to claim 4 wherein the FCC catalyst heater is an oxygen thermal lance used to burn oxygen as a heat source.

6. A process according to claim 1 further comprising the step of:
   using the FCC catalyst heater with a gas distributor.

7. A process according to claim 1 further comprising the step of:
   using the FCC catalyst heater to operate the regenerator at temperatures in the range of about 1000 degree to 1600 degree F.

8. A process according to claim 1 further comprising the step of:
   using the FCC catalyst heater to achieve adequate combustion while keeping catalyst temperature below those at which significant catalyst degradation can occur.

9. A process according to claim 1 wherein the step of using the FCC catalyst heater debottlenecks FCC capacity thereby allowing high feed rates at constant CO2 emissions.

10. A process according to claim 1 wherein the step of using the FCC catalyst heater increases the liquid volume yield of transportation fuels.

11. A process according to claim 1 where the low carbon fuel may be natural gas, refinery fuel gas, hydrogen, oxygen, light hydrocarbon or sponge absorber off-gas product from the FCC catalyst heater recycled back to the regenerator.

12. A process according to claim 1 wherein the FCC catalyst heater reduces a coke yield resulting in decrease NOx, SOx and COx emissions.

13. A process according to claim 1 wherein the step of using the FCC catalyst heater results in higher circulating catalyst activity due to lower carbon on regenerated catalyst.

14. A process according to claim 1 further comprising the step of using split fuel gas injection and independent air/oxygen/gas injection to control heat flux generation Btu/hr/Ft2 in the regenerator or combustion chamber to limit particle temperatures and deactivation.

15. A process according to claim 1 wherein the FCC catalyst heater is used effectively for independent control of regenerated catalyst temperature to control yield selectivities and feed conversion.

16. The process according to claim 1 wherein the FCC catalyst heater reduces the FCC feed coke yield resulting in increased product yield.

* * * * *